United States Patent
Matsuyama (10) Patent No.: US 8,964,043 B2
(45) Date of Patent: Feb. 24, 2015

(54) IMAGING APPARATUS AND CONTROL METHOD THEREOF

(75) Inventor: Ichiro Matsuyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 561 days.

(21) Appl. No.: 12/943,173

(22) Filed: Nov. 10, 2010

(65) Prior Publication Data

US 2011/0149096 A1 Jun. 23, 2011

(30) Foreign Application Priority Data

Dec. 21, 2009 (JP) .................................. 2009-289652

(51) Int. Cl.
| | |
|---|---|
| H04N 5/228 | (2006.01) |
| H04N 5/232 | (2006.01) |
| H04N 5/357 | (2011.01) |
| H04N 5/225 | (2006.01) |
| G02B 13/16 | (2006.01) |

(52) U.S. Cl.
CPC ......... *H04N 5/23248* (2013.01); *H04N 5/2327* (2013.01); *H04N 5/3572* (2013.01)
USPC ....................................... 348/208.4; 348/335

(58) Field of Classification Search
CPC .............. H04N 5/3572; H04N 5/2254; H04N 5/23212; H04N 9/045; G02B 15/177
USPC ........................................ 348/208.99–208.16
See application file for complete search history.

(56) References Cited

U.S. PATENT DOCUMENTS

| | | | | |
|---|---|---|---|---|
| 5,973,733 | A * | 10/1999 | Gove | 348/208.13 |
| 7,511,756 | B2 * | 3/2009 | Kawai | 348/335 |
| 7,834,907 | B2 * | 11/2010 | Kawai | 348/208.4 |
| 8,330,824 | B2 * | 12/2012 | Hashi et al. | 348/208.5 |
| 2004/0218813 | A1 * | 11/2004 | Okada et al. | 382/167 |
| 2006/0061660 | A1 * | 3/2006 | Brackmann | 348/208.1 |
| 2007/0252905 | A1 | 11/2007 | Kamiya et al. | |
| 2010/0157071 | A1 * | 6/2010 | Lee | 348/208.2 |
| 2010/0177198 | A1 * | 7/2010 | Hayashi et al. | 348/208.2 |
| 2010/0245603 | A1 * | 9/2010 | Hashi et al. | 348/208.5 |

FOREIGN PATENT DOCUMENTS

| | | |
|---|---|---|
| JP | 2007-293457 | 11/2007 |
| JP | 2009-124314 | 6/2009 |

* cited by examiner

*Primary Examiner* — Christopher K Peterson
(74) *Attorney, Agent, or Firm* — Cowan, Liebowitz & Latman, P.C.

(57) ABSTRACT

When correcting rotary shake, an area to be referenced when distortion aberration correction is performed is rotated by a detected rotation amount in a direction correcting the rotary shake, such that the reference area fits into the area of an image that has been captured. A rectangular image of the same size as the captured image is obtained by applying distortion aberration correction to an image included in the reference area. If the reference area will not fit into the area of the captured image when rotated by the detected rotation amount, the reference area is rotated by a maximum angle at which the reference area will fit into the area of the captured image, and distortion aberration correction is applied to the image included in the reference area. Information on the captured angle of view can thereby be effectively used when performing distortion aberration correction and rotary shake correction.

13 Claims, 7 Drawing Sheets

IMAGING APPARATUS AND CONTROL METHOD THEREOF

BACKGROUND OF THE INVENTION

1. Field of the Invention

The present invention relates to an imaging apparatus and a control method thereof that enable image shake in a rotation direction whose rotation axis is the optical axis of an imaging optical system and that is produced by shake of the imaging apparatus to be corrected.

2. Description of the Related Art

In recent years, there have been imaging apparatus such as digital cameras and digital video cameras that are capable of optically correcting vibrations (camera shake) conveyed from the user's hand in a direction perpendicular to the optical axis of an imaging optical system, by driving the image sensor or a correction lens provided in the imaging optical system. On the other hand, since it is unrealistic from a production cost viewpoint, to provide the image sensor with a rotation mechanism in order to correct the rotary component of an image whose rotation axis is the optical axis of an imaging optical system produced by camera shake, the problem of correcting the rotary component is solved by image processing that involves rotating the image in the opposite direction to the detected rotation around the optical axis.

Figure 2:
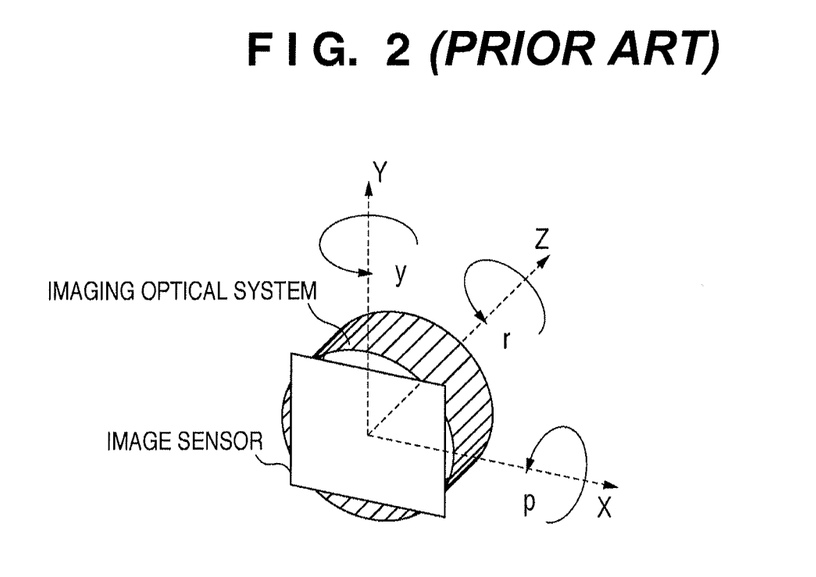
FIG. 2 is a diagram for describing the relation between an imaging optical system and an image sensor, and between the rotation directions.

For example, in the case where triaxial movement directions are defined as shown in FIG. 2 relative to the positional relation of the imaging optical system and the image sensor, the optical axis direction will be the Z axis, the Y axis will be the upward direction of the imaging optical system, and the X axis will be orthogonal to the Y and Z axes. At this time, the rotary component of shake of the imaging apparatus is detected separately as three components consisting of a pitch component, which is rotation around the X axis, a yaw component, which is rotation around the Y axis, and a roll component, which is rotation around the Z axis. Since the rotation of the pitch and yaw components can be regarded as a translational movement in the X and Y axial directions, camera shake can be reduced by driving the imaging optical system so as to reduce movement of the image formed on the image sensor. In contrast, in order to correct the rotation of the roll component (rotary shake), which is rotation around the optical axis of the imaging optical system, correction is performed by an image processing circuit provided in the imaging apparatus, for example.

Figure 3A:
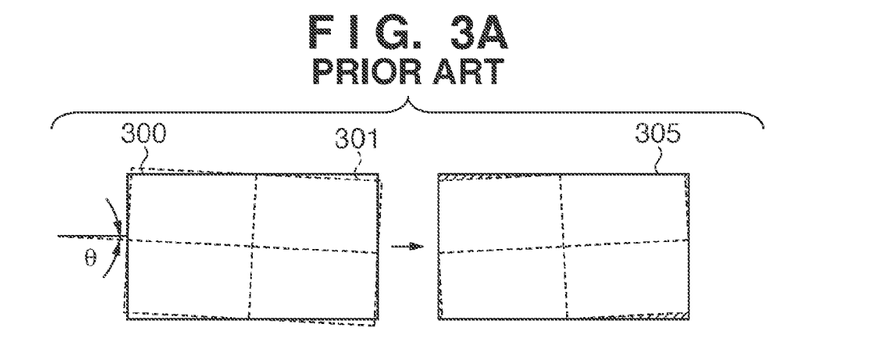
FIGS. 3A, 3B, 3C and 3D are diagrams for describing rotary shake correction according to Embodiment 1.

In the case where rotary shake at an angle θ in the counterclockwise direction is detected as the rotation of the roll component such as shown in FIG. 3A, a captured image 300 output from the image sensor is rotated such that the vertical direction of the object image rotates by the angle θ in the clockwise direction. Thus, by clipping an area 301 that has been rotated by the angle θ in the opposite direction to the direction of the detected rotary shake, that is, in the clockwise direction, an image 305 corrected for rotary shake can be generated. However, correcting rotary shake results in information (shaded areas in FIG. 3A) on an angle of view that is not included in the captured image 300 constituting the imaging range being included in the image 305 corrected for rotary shake. Thus, when outputting an image corrected for rotary shake that has the same pixel count as the captured image, it is necessary to clip the maximum area having the same aspect ratio as the captured image from an area of the image 305 that does not include the shaded areas, and apply electronic zoom to the clipped area. In contrast, Japanese Patent Laid-Open No. 2009-124314 discloses a method of correcting rotary shake, by clipping a rectangular area rotated by the rotation amount in the opposite direction to the rotary shake, so as to fit within the area of the captured image.

Figure 3B:
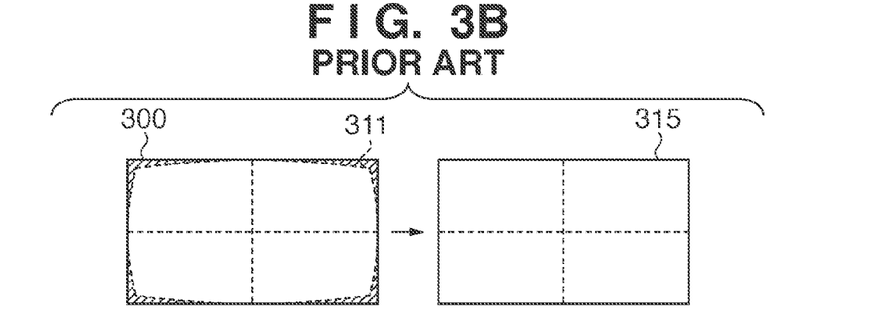

There are also imaging optical systems that have distortion aberration due to the influence of the curvature of the respective lenses, and when imaging is performed using such an imaging optical system, barrel distortion aberration may occur in which the image formed on the image sensor is distorted toward the center particularly at the wide-angle side. Heretofore, in order to correct barrel distortion aberration, a distortion aberration-corrected image 315 having the same pixel count as the captured image can be obtained, by clipping a barrel-shaped area 311 from the captured image 300 and performing distortion aberration correction on the clipped area as shown in FIG. 3B. Japanese Patent Laid-Open No. 2007-293457 discloses a technique for clipping and outputting a desired range from the area of an object image, out of an image obtained by correcting rotary shake after performing distortion aberration correction, in an imaging apparatus having an imaging optical system in which distortion aberration changes between being barrel-shaped and pincushion-shaped depending on the zoom ratio.

However, when performing distortion aberration correction, information (shaded portion in FIG. 3B) on the areas of the four corners that cannot be referenced from the image 315 to which distortion aberration correction has been applied may be eliminated, since the barrel-shaped area is clipped from the captured image 300 and expanded as shown in FIG. 3B. Thus, with methods that involve clipping an image corrected for rotary shake from an image to which distortion aberration correction has been applied, such as Japanese Patent Laid-Open Nos. 2009-124314 and 2007-293457, there is possibly information on the captured angle of view constituting the captured image that cannot be used effectively. That is, since information on the four corners is eliminated from the captured image output by the image sensor due to distortion aberration correction, and information is further extracted when rotary shake correction is performed, an image corrected for rotary shake having a narrower angle of view than the captured angle of view may be obtained.

SUMMARY OF THE INVENTION

The present invention has been made in consideration of such conventional technology.

The present invention provides for effective use of information on a captured angle of view, when correcting distortion aberration and rotary shake.

The present invention in its first aspect provides an imaging apparatus comprising: imaging unit configured to output an image captured via an imaging optical system; detection unit configured to detect rotary shake, whose rotation axis is an optical axis of the imaging optical system, of shake of the imaging apparatus; rotary correction unit configured to correct the rotary shake detected by the detection unit, by rotating a reference area of the captured image with the optical axis of the imaging optical system as the rotation axis in an area of the captured image; and distortion aberration correction unit configured to correct distortion aberration in an image included in the reference area due to the imaging optical system, wherein the rotary correction unit rotates the reference area with the optical axis of the imaging optical system as the rotation axis, such that the reference area which referenced for correcting the distortion aberration in a case of there being no rotary shake fits into the area of the captured image, and the distortion aberration correction unit corrects the distortion aberration for the image included in the reference area which rotated in the area of the captured image.

Further features of the present invention will become apparent from the following description of exemplary embodiments (with reference to the attached drawings).

DESCRIPTION OF THE EMBODIMENTS

Embodiment 1

Hereinafter, an embodiment of the present invention will be described in detail with reference to the drawings. Note that in the embodiment described hereinafter, examples will be described in which the present invention is applied to a digital video camera capable of detecting triaxial rotary shake served as an example of an imaging apparatus. However, the present invention is applicable to an arbitrary device capable of detecting at least rotary shake around the optical axis. Note that the present embodiment will be described assuming correction is performed when the optical zoom ratio of a digital video camera 100 is at the wide-angle side (100% magnification). However, the embodiments of the present invention are not limited to the optical zoom ratio being at the wide-angle side.

Figure 1:
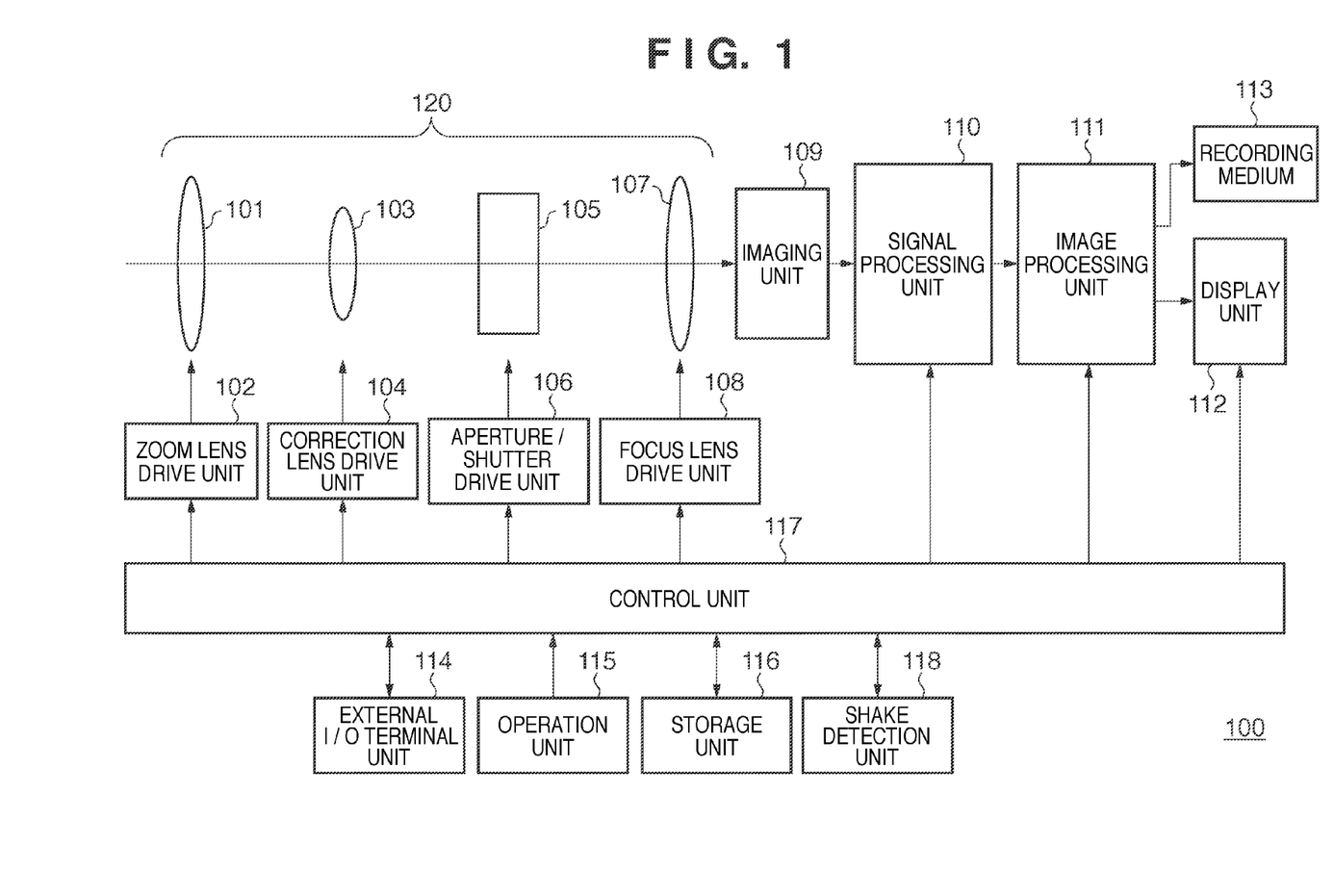
FIG. 1 is a diagram representing a functional configuration of a digital video camera according to an embodiment.

FIG. 1 is a block diagram showing a functional configuration of a digital video camera according to embodiments of the present invention.

A control unit 117 denotes a CPU, for example, and controls operation of each block provided in the digital video camera 100. The control unit 117 controls operation of each block of the digital video camera 100, by reading out an operation program for each block of the digital video camera 100 stored in a storage unit 116 (discussed later), for example, expanding the read program in RAM (not shown), and executing the expanded program. The storage unit 116 is a rewritable nonvolatile memory, and stores parameters such as the curvature and focal length of the lenses of an imaging optical system 120 (discussed later), for example, in addition to the operation programs of the blocks of the digital video camera 100. The storage unit 116 also stores information on amounts of distortion aberration corresponding to optical zoom ratios, for example. In addition, the storage unit 116 records required parameters, settings and the like required in operations performed by the blocks of the digital video camera 100.

The imaging optical system 120, which is a group of lens constituted by a zoom lens 101, a correction lens 103, a focus lens 107 and the like, collects reflected light from the object in the digital video camera 100, and forms an object image on an image sensor provided in an imaging unit 109 (discussed later). The zoom lens 101 is a lens (zoom unit) that realizes an optical zoom function of the digital video camera 100, and the zoom ratio of the object image formed on the image sensor can be changed as a result of the position of the zoom lens being changed in the optical axis direction by a zoom lens drive unit 102. The control unit 117 transmits position information on the zoom lens 101 that depends on the optical zoom ratio, for example, to the zoom lens drive unit 102, and causes the zoom lens drive unit 102 to drive the zoom lens 101. The correction lens 103 realizes a (image shake correction) function of alleviating camera shake detected by a shake detection unit 118 (discussed later) that occurs when imaging with the digital video camera 100. The correction lens 103 reduces shake in the object image formed on the image sensor, as a result of the position of the correction lens being altered in an orthogonal direction to the optical axis by a correction lens drive unit 104. The control unit 117 transmits the amount of shake in the direction orthogonal to the optical axis detected by the shake detection unit 118 to the correction lens drive unit 104, when the camera shake correction function of the digital video camera 100 is enabled, for example, and causes the correction lens drive unit 104 to drive the correction lens 103. An aperture/shutter 105 has a function of altering the amount of exposure at the time of imaging. For example, in the case where a large amount of reflected light from the object is incident on the digital video camera 100, the control unit 117 sets a large aperture value and a fast shutter speed. The control unit 117 transmits information on the aperture value and the shutter speed to an aperture/shutter drive unit 106, and causes the aperture/shutter drive unit 106 to drive the aperture/shutter 105. The focus lens 107 is driven so as to focus and form an object image on the image sensor provided in the imaging unit 109. Specifically, the control unit 117 transmits position information on the focus lens focusing the object image on the image sensor, computed by a method such as defocus amount calculation, for example, to a focus lens drive unit 108, and causes the focus lens drive unit 108 to drive the focus lens 107. Note that, in the present invention, the imaging optical system 120 is described as having barrel distortion aberration particularly at a wide-angle optical zoom ratio.

The imaging unit 109 is a block provided with an image sensor such as a CCD or CMOS sensor, for example, and the object image formed on the image sensor is photoelectrically converted, and the obtained analog image signal is output to a signal processing unit 110. The signal processing unit 110 applies processing such as signal amplification and A/D conversion to the input analog image signal, and outputs digital image data (image data) to an image processing unit 111. The image processing unit 111 performs various correction processes such as blemish correction on the input image data, image data compression, and the like. The image processing unit 111 is capable of extracting, from the entire area of the image data, an area of the image to be output as the captured image, in accordance with clipping frame setting information stored in the storage unit 116, for example. Also, the image processing unit 111 corrects distortion aberration in the image data (distortion aberration correction), in accordance with information on the lens parameters, lens position and the like of the lenses of the imaging optical system 120 stored in the storage unit 116, for example. Further, the image processing unit 111 corrects rotary shake (rotary correction) by rotating the image data in accordance with an amount of rotation whose rotation axis is the optical axis, out of the rotation detected by the shake detection unit 118.

A display unit 112 is a display device such as a compact LCD, for example, and is capable of displaying image data to which various processing has been applied by the image processing unit 111, image and video data recorded on a recording medium 113 (discussed later), and GUI recorded in the storage unit 116, for example. If the digital video camera 100 is in imaging mode, the display unit 112 functions in particular as an electronic viewfinder (EVF), by sequentially displaying captured image data. The recording medium 113 is a medium capable of recording image and video data captured by the digital video camera 100, such as an internal memory provided in the digital video camera 100, or a memory card, HDD or DV tape detachably mounted in the digital video camera 100, for example. Image data to which various processing has been applied by the image processing unit 111, video data stored in RAM (not shown), or the like, is input to the recording medium 113 and recorded as a result of an instruction from the control unit 117, for example.

An external input/output (I/O) terminal 114, such as a USB or LAN I/O terminal, for example, is capable of connecting the digital video camera 100 to an external device, and transmits and receives communication signals and video signals, for example, to and from the connected external device. An operation unit 115 is an input interface that receives input from the user, such as an imaging start button, an imaging mode switching switch or the like, provided in the digital video camera 100, and on receiving input from the user, transmits the input content to the control unit 117.

The shake detection unit 118 detects rotation or vibrations conveyed to the digital video camera 100 due to camera shake when the user is holding the digital video camera 100 to perform imaging, and conveys the detection results to the control unit 117. In the present embodiment, the shake detection unit 118 is described as detecting shake applied in triaxial rotation directions such as shown in FIG. 2. FIG. 2 represents the positional relation between the imaging optical system 120 and the image sensor provided in the imaging unit 109, and the rotation axes thereof. For example, in the case where the optical axis direction is the Z axis and the Y axis is the upward direction set in the digital video camera 100, the X axis is respectively orthogonal to the Y axis and the Z axis. At this time, shake applied in the rotation direction of the digital video camera 100 is detected separately as three components consisting of a pitch component, which is rotation around the X axis, a yaw component, which is rotation around the Y axis, and a roll component, which is rotation around the Z axis which is the optical axis. Note that as far as the rotation of the pitch and yaw components is concerned, the control unit 117, as a result of viewing the rotation of these components as translational movement in the X and Y axial directions, causes the correction lens drive unit 104 to drive the correction lens 103 in the opposite direction to the translational movement, in order to reduce movement in the image formed on the image sensor. In the present invention, the rotation of the roll component will be subsequently described as rotary shake. As discussed above, since it is difficult to separate the roll component of shake of the digital video camera 100 (rotary shake) into movement components in the X and Y axial directions, unlike the aforementioned pitch and yaw components, correction of rotary shake is realized by image processing in the image processing unit 111.

Figure 3C:
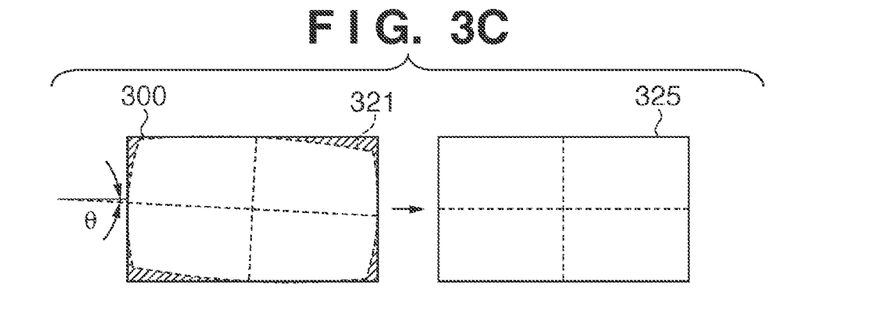

Here, processing for correcting rotary shake in the present embodiment will be described using the diagrams. FIG. 3C represents the case where processing for correcting distortion aberration and rotary shake is applied to an image 300 that was captured by the imaging unit 109, in the case where rotary shake at an angle θ around the optical axis is detected. In the present embodiment, distortion aberration correction is performed after applying rotary shake correction, unlike the conventional methods that involve correcting rotary shake after performing processing for correcting barrel distortion aberration. Note that while the present specification is described in terms of distortion aberration correction being performed after applying rotary shake correction in order to facilitate understanding of the processing flow, the embodiments of the present invention are not limited thereto, and a configuration may be adopted in which distortion aberration correction is performed simultaneously with rotary shake correction, or in which distortion aberration correction and rotary shake correction are performed within the same hardware. With distortion aberration, the amount of distortion increases depending on image height, thus the four corners of a barrel-shaped area whose image height is particularly high are distorted inwardly compared with the area of the captured image. Thus, the barrel-shaped area is rotatable within the area of the captured image in the rotary shake correction process. Also, distortion aberration, being dependent only on image height, is constant with rotary shake, and a rectangular image from which the influence of distortion aberration has been removed can be obtained by clipping the image of a barrel-shaped area 321 corrected for rotary shake, and applying the same processing as when performing distortion aberration correction to the clipped image. An image 325 to which distortion aberration correction and rotary shake correction have been applied that is of the same size as the captured image is thereby acquired. That is, in the present embodiment, rotary shake can be corrected using the image of areas that would no longer be referenced when performing distortion aberration correction with a conventional method, thereby enabling the rectangular image 325 of the same size as the captured image to be obtained without applying electronic zoom.

Figure 3D:
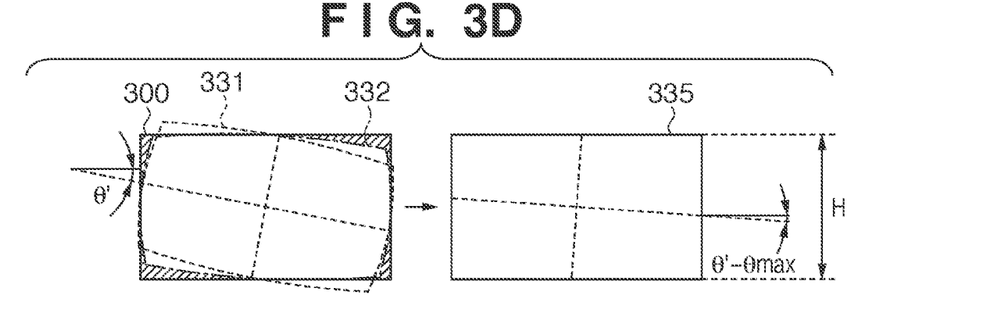

Note that while differing depending on the imaging optical system, there is a maximum angle $θ_{max}$ at which the barrel-shaped area to be referenced in distortion aberration correction is rotatable in one rotation direction within the captured image. For example, in the case where the detected roll component of shake (rotary shake) of the digital video camera 100 is an angle θ' that is greater than angle $θ_{max}$, a barrel-shaped area 331 that has been rotated by the angle θ' in the opposite direction to the rotation direction will not fit in the area of the captured image 300 as shown in FIG. 3D. In such a case, in the present embodiment a barrel-shaped area 332 that has been rotated by the maximum angle $θ_{max}$ in the opposite direction to the rotation direction is clipped, and an image for recording is output after performing distortion aberration correction. While the influence of rotary shake of an angle $θ'-θ_{max}$ remains in an image 335 output at this time, distortion aberration correction is performed, and the influence of rotary shake is reduced to the maximum extent possible without applying electronic zoom.

Figure 7:
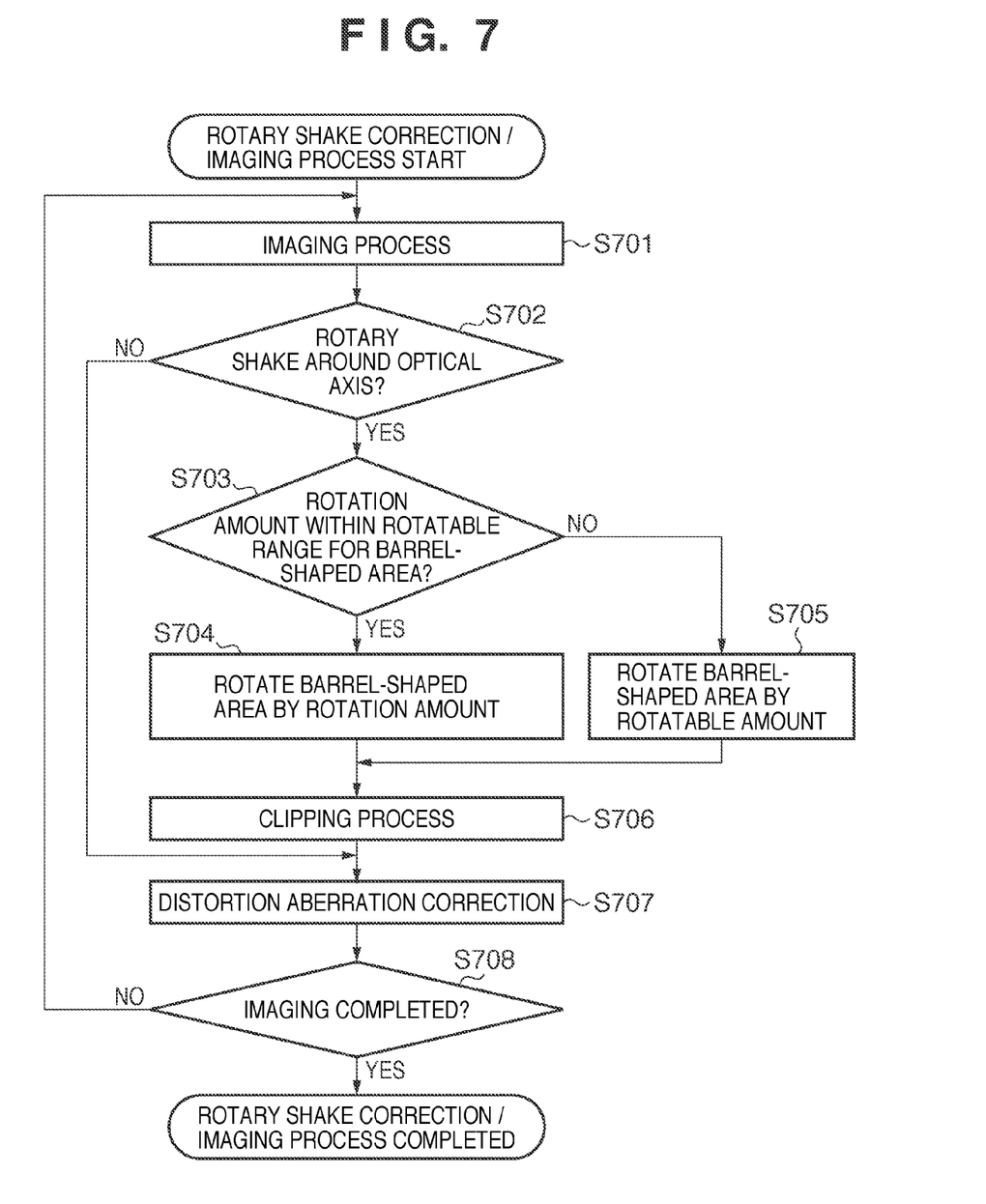
FIG. 7 is a flowchart showing a rotary shake correction/imaging process according to Embodiment 1.

The rotary shake correction/imaging process in the digital video camera of the present embodiment having such a configuration will be described further using the flowchart of FIG. 7. Note that this rotary shake correction/imaging process is started by the control unit 117 when the imaging start button provided in the operation unit 115 is pressed by the user, in a state where the camera shake correction function of the digital video camera 100 is enabled.

In S701, the control unit 117 causes the drive units to drive the respective lenses of the imaging optical system 120, and causes the imaging unit 109 to photoelectrically convert the object image that is formed. The control unit 117 causes the signal processing unit 110 to apply various processing to the analog image signal output by the imaging unit 109, and to output the obtained image data to the image processing unit 111. Further, the control unit 117 causes the image processing unit 111 to apply correction processing other than rotary correction to the input image data.

In S702, the control unit 117 acquires from the shake detection unit 118 rotary shake information on the digital video camera 100 detected when the image data was captured. At this time, if rotary shake was applied to the digital video camera 100, the control unit 117 moves the processing to S703, having determined that rotary shake has occurred. In the case where there is no rotary shake or where the amount of rotary shake is smaller than an angle for disregarding rotary shake pre-stored in the storage unit 116, for example, the control unit 117 moves the processing to S707, having determined that there is no rotary shake.

In S703, the control unit 117 judges whether the absolute value of the amount of rotation around the optical axis of the digital video camera 100 at the time of imaging acquired from the shake detection unit 118 is less than or equal to the maximum angle $\theta_{max}$ that the barrel-shaped area to be referenced in distortion aberration correction can rotate in one rotation direction within the captured image. The control unit 117 moves the processing to S704 if the absolute value of the rotation amount around the optical axis is less than or equal to $\theta_{max}$, and moves the processing to S705 if the absolute value of the rotation amount around the optical axis is greater than $\theta_{max}$. Note that information on the maximum angle $\theta_{max}$ rotatable in one rotation direction is stored in the storage unit 116, for example, and can be read out by the control unit 117 at this step.

In S704, the control unit 117 transmits the rotation amount of rotary shake of the digital video camera 100 at the time of imaging acquired from the shake detection unit 118 to the image processing unit 111, and causes the image processing unit 111 to rotate the barrel-shaped area to be referenced in distortion aberration correction by the absolute value of the rotation amount in the opposite direction to the rotary shake. The control unit 117, in S705, transmits information on the maximum angle $\theta_{max}$ rotatable in one rotation direction stored in the storage unit 116, for example, and causes the image processing unit 111 to rotate the barrel-shaped area to be referenced in distortion aberration correction by the maximum angle $\theta_{max}$ in the opposite direction to the rotary shake.

In S706, the control unit 117 causes the image processing unit 111 to clip the image of the barrel-shaped area rotated in S704 or S705. The control unit 117 rotates the barrel-shaped area clipped by the image processing unit 111 in S706 by the angle rotated in S704 or S705 in the detected rotation shake direction, in order to remove the influence of the rotation processing (straighten the vertical direction of the axis of the earth). The control unit 117 then causes the image processing unit 111 to apply distortion aberration correction to the barrel-shaped area from which the influence of the rotation processing has been removed, thus obtains a rectangular image (S707).

In S708, the control unit 117 judges whether the imaging for recording has been completed. Specifically, in the case where, for example, the digital video camera 100 was performing continuous still image capture or moving image capture, the control unit 117 judges whether an input to end the imaging process has been input to the operation unit 115 by the user. In the case where imaging for recording has been completed, the control unit 117 completes the rotary shake correction/imaging process. Note that if normal still image capture was being performed, the control unit 117 can complete the rotary shake correction/imaging process, since the imaging process is performed once. Note that the captured image data to which distortion aberration correction and rotary shake correction has been applied is, for example, temporarily stored in RAM, and when the imaging process is judged in the present step to have been completed, the control unit 117 can record the image or video data to the recording medium 113.

As described above, the imaging apparatus of the present embodiment has an imaging optical system having distortion aberration, and is capable of acquiring a rectangular image corrected for rotary shake, when rotary shake is detected at the time of imaging. Specifically, when correcting rotary shake, a barrel-shaped area to be referenced when performing distortion aberration correction is rotated by the detected rotation amount in a direction correcting the rotary shake, such that the reference area fits within the area of the captured image. A rectangular image of the same size as the captured image is then obtained by applying distortion aberration correction to the captured image included within the barrel-shaped area. In the case where the barrel-shaped area will not fit within the area of the captured image when rotated by the detected rotation amount, the barrel-shaped area is rotated by the maximum angle at which the barrel-shaped area will fit within the area of the captured image, and distortion aberration correction is applied to the captured image included within the barrel-shaped area.

The imaging apparatus of the present embodiment can thereby correct rotary shake using information on non-referenceable areas that would be eliminated in the distortion aberration correction in the case where processing to correct rotary shake whose rotation axis is the optical axis is performed after the distortion aberration correction. Since distortion aberration correction on the barrel-shaped area to be referenced in distortion aberration correction based on the area of the captured image is applied after correcting rotary shake, an image in which the influences of distortion aberration and rotary shake whose rotation axis is the optical axis have been reduced can be obtained, without applying electronic zoom.

Embodiment 2

In Embodiment 1, an imaging apparatus was described that outputs an image in which the influences of barrel distortion aberration correction at the wide-angle side and rotation up to a maximum angle $\theta_{max}$ at which a barrel-shaped area to be referenced in distortion aberration correction is rotatable in one rotation direction within the captured image have been reduced. In the present embodiment, an imaging apparatus capable of correcting rotary shake up to a prescribed angle $\theta_{lim}$ that is less than or equal to $\theta_{max}$ at any zoom ratio in the case where the optical zoom ratio changes will be further described. Note that since the functional configuration of the digital video camera 100 serving as an imaging apparatus of the present embodiment is the same as Embodiment 1, description thereof will be omitted.

Figure 6A:
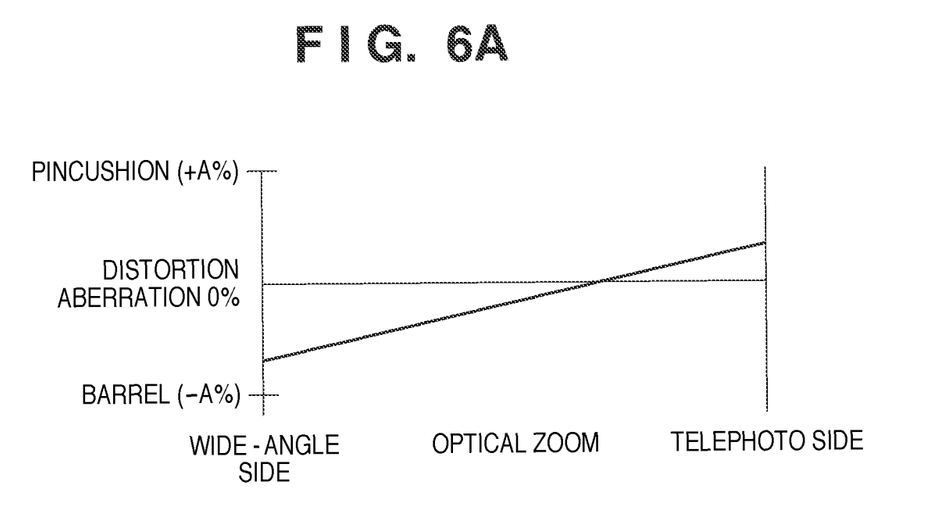
FIGS. 6A and 6B are diagrams representing amounts of distortion aberration relative to optical zoom ratios, and the application rate of electronic zoom.

In the imaging optical system 120 of the digital video camera 100, distortion aberration changes as shown in FIG. 6A when the optical zoom ratio is altered. In FIG. 6A, the horizontal axis represents the optical zoom ratio, and the vertical axis represents the amount of distortion aberration for an arbitrary image height. Distortion aberration thus changes from barrel to pincushion according to the optical zoom ratio when the zoom ratio is altered.

Figure 5A:
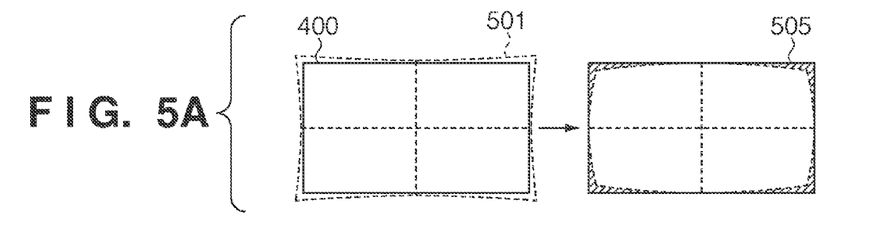
FIGS. 5A, 5B and 5C are another diagrams for describing rotary shake correction according to Embodiment 2.

Here, pincushion distortion aberration correction will be described using FIG. 5A.

With a pincushion shape, the object image is formed on the image sensor as shown by reference numeral 501 relative to a captured image 400 to be output from the image sensor, thus the captured image 400 does not include the entire area of the formed object image. Thus, when pincushion distortion aberration correction is performed on the captured image 400 that does not contain the entire area of the object image, an image 505 that is obtained will be an image in which the areas of the four corners where the image height was high are distorted toward the center. Since the image of the portion of the area included in the object image 501 that is not included in the captured image 400 cannot be referenced when correction is performed, the areas of the four corners in the obtained image 505 include areas that have no image information. Thus, when performing pincushion distortion aberration correction, electronic zoom is applied to obtain an image of the same size as the captured image, since it is necessary to perform distortion aberration correction based on a pincushion-shaped area of a size that fits into the area of the captured image, and the image obtained after performing distortion aberration correction will be smaller than the captured image.

Figure 6B:
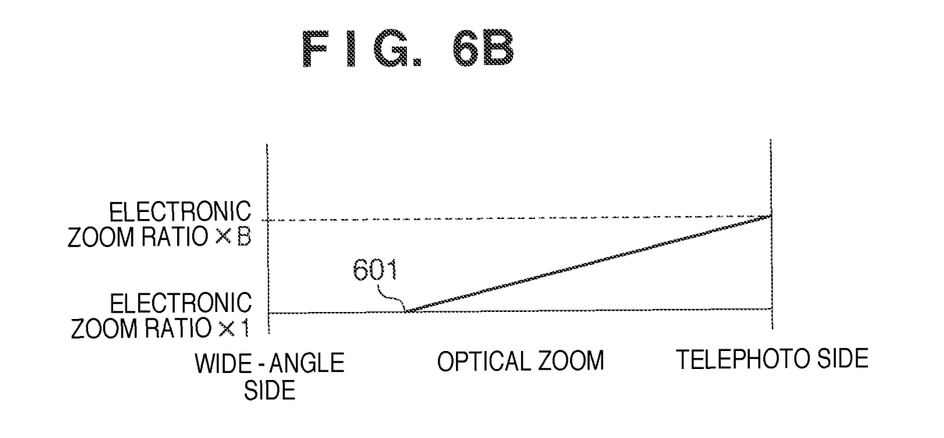

In the case where the optical zoom ratio is changed from the wide-angle side toward the telephoto side, the maximum angle $\theta_{max}$ at which an area to be referenced in distortion aberration correction is rotatable in one rotation direction within the captured image as described in Embodiment 1 gradually decreases. Thus, the following results when an angle $\theta_{lim}$ that is less than or equal to the angle $\theta_{max}$ at which an area (maximum area) enabling an image of the same size as the captured image to be acquired after distortion aberration correction is rotatable within the area of the captured image is set as a limit angle for rotary shake correction. While the maximum area can be rotated by the limit angle $\theta_{lim}$ within the area of the captured image for optical zoom ratios up to a given zoom ratio 601, the maximum area, when rotated by the same $\theta_{lim}$, will not fit within the area of the captured image at zoom ratios greater than the given zoom ratio 601. In view of this, the digital video camera 100 of the present embodiment adopts a configuration that enables the maximum area to be rotated within the area of the captured image at the set limit angle $\theta_{lim}$, even when the optical zoom ratio is greater than the aforementioned given zoom ratio 601. Specifically, the area to be referenced in distortion aberration correction is transformed to a size that fits within the area of the captured image, when the reference area is rotated by the limit angle $\theta_{lim}$ within the area of the captured image, irrespective of the detected rotation amount of rotary shake, at respective optical zoom ratios greater than the given zoom ratio 601. Rotary shake can thereby be corrected for optical zoom ratios of any value, up to the limit angle $\theta_{lim}$ less than or equal to the angle $\theta_{max}$ at which the maximum area to be referenced in distortion aberration correction when at the wide-angle side is rotatable within the area of the captured image. Also, at this time, if the optical zoom ratio is greater than the given zoom ratio 601, the size of the image obtained after distortion aberration correction will be smaller than the captured image, since the area to be referenced in the distortion aberration correction is transformed to an area smaller than the maximum area, in order to perform rotation at the limit angle. Thus, as shown in FIG. 6B, if the optical zoom ratio is greater than the given zoom ratio 601, electronic zoom is applied to the distortion aberration-corrected image to make the image the same size as the captured image. Also, in the present embodiment, information on the distortion aberration of the imaging optical system 120 is known, thus information on the given zoom ratio 601, information on the transformed area to be referenced in distortion aberration correction and information on the limit angle can be pre-stored in the storage unit 116, for example, in association with the zoom ratio. Note that the information on the limit angle can be altered by the user using the operation unit 115 when the digital video camera 100 is in setting mode, for example.

Next, the area to be referenced in distortion aberration correction that will be transformed in the case of the optical zoom ratio being greater than the given zoom ratio 601 will be described.

Figure 4A:
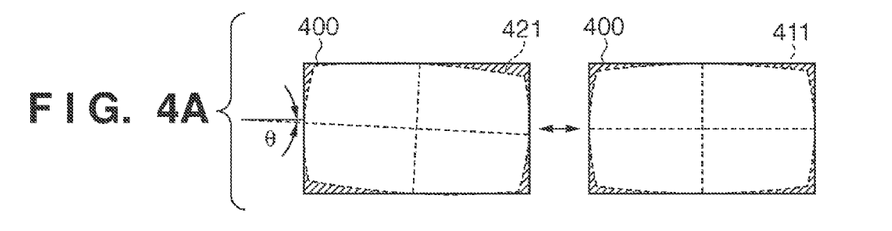
FIGS. 4A and 4B are diagrams for describing rotary shake correction according to Embodiment 2.
Figure 4B:
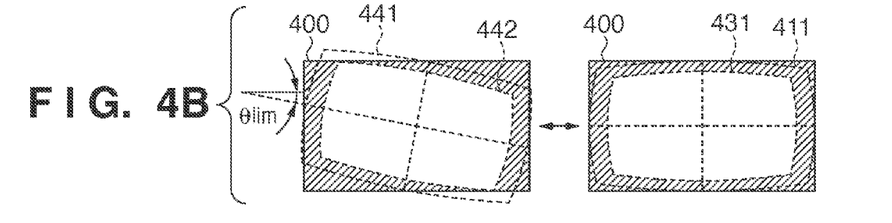

FIGS. 4A and 4B represent the captured image 400 and barrel-shaped areas to be referenced in distortion aberration correction for an optical zoom ratio greater than the given zoom ratio 601, on which barrel distortion aberration correction will be performed. In FIG. 4A, the barrel-shaped area 411 is an area whose image will be the same size as the captured image 400 after distortion aberration correction is performed. The image obtained by rotating this barrel-shaped area 411 by an angle $\theta$ ($\theta<\theta_{lim}$) rotatable within the area of the captured image will be a barrel-shaped area 421. When this barrel-shaped area is rotated by the limit angle $\theta_{lim}$ within the area of the captured image as shown in FIG. 4B, in order to enable correction of rotary shake of the limit angle $\theta_{lim}$ in Such an optical zoom ratio, the area to be referenced in distortion aberration correction is made to fit within the area of the captured image. Specifically, the area to be referenced in distortion aberration correction is transformed from an area 441 obtained by rotating the barrel-shaped area 411 by the limit angle $\theta_{lim}$ to a barrel-shaped area 442 having the same rotation center as the barrel-shaped area 441. The barrel-shaped area 442 enables an image smaller than but having the same aspect ratio as the captured image to be acquired after distortion aberration correction, and is inscribed on the captured image 400 when rotated by the angle $\theta_{lim}$. Thus, at an optical zoom ratio such as in FIGS. 4A and 4B, the area to be referenced in distortion aberration correction will be a smaller area than the barrel-shaped area 411, such as a barrel-shaped area 431, even if there is no rotary shake. Note that the transformed barrel-shaped areas 431 and 442 are dissimilar in shape to the maximum areas 411 and 441, since distortion aberration decreases enough to be disregarded the smaller (closer to the center) the image height.

Figure 5B:
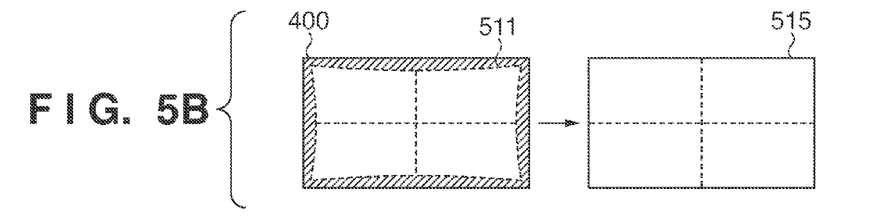
Figure 5C:
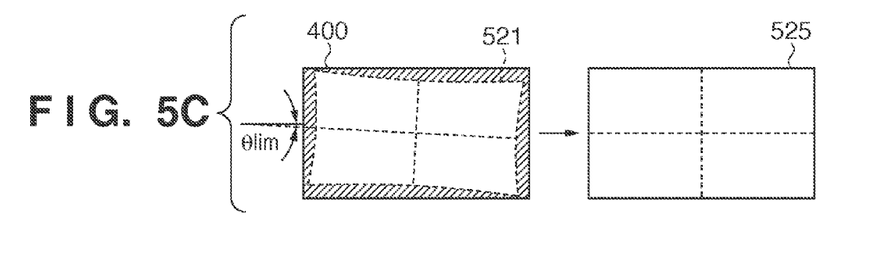

FIGS. 5B and 5C represent the captured image 400 and pincushion-shaped areas to be referenced in distortion aberration correction for an optical zoom ratio greater than the given zoom ratio 601, on which pincushion distortion aberration correction will be performed. A pincushion-shaped area 521 has been transformed such that the area to be referenced in distortion aberration correction fits within the captured image when rotated by the limit angle $\theta_{lim}$ within the area of the captured image. If there is no rotary shake at this zoom ratio, a pincushion-shaped area 511 of the same size as the pincushion-shaped area 521 will constitute the area referenced in distortion aberration correction. Rectangular images 515 and 525 of the same size as the captured image can be obtained by applying electronic zoom of the same magnification to the pincushion-shaped areas 511 and 521 after performing rotary shake correction.

Figure 8:
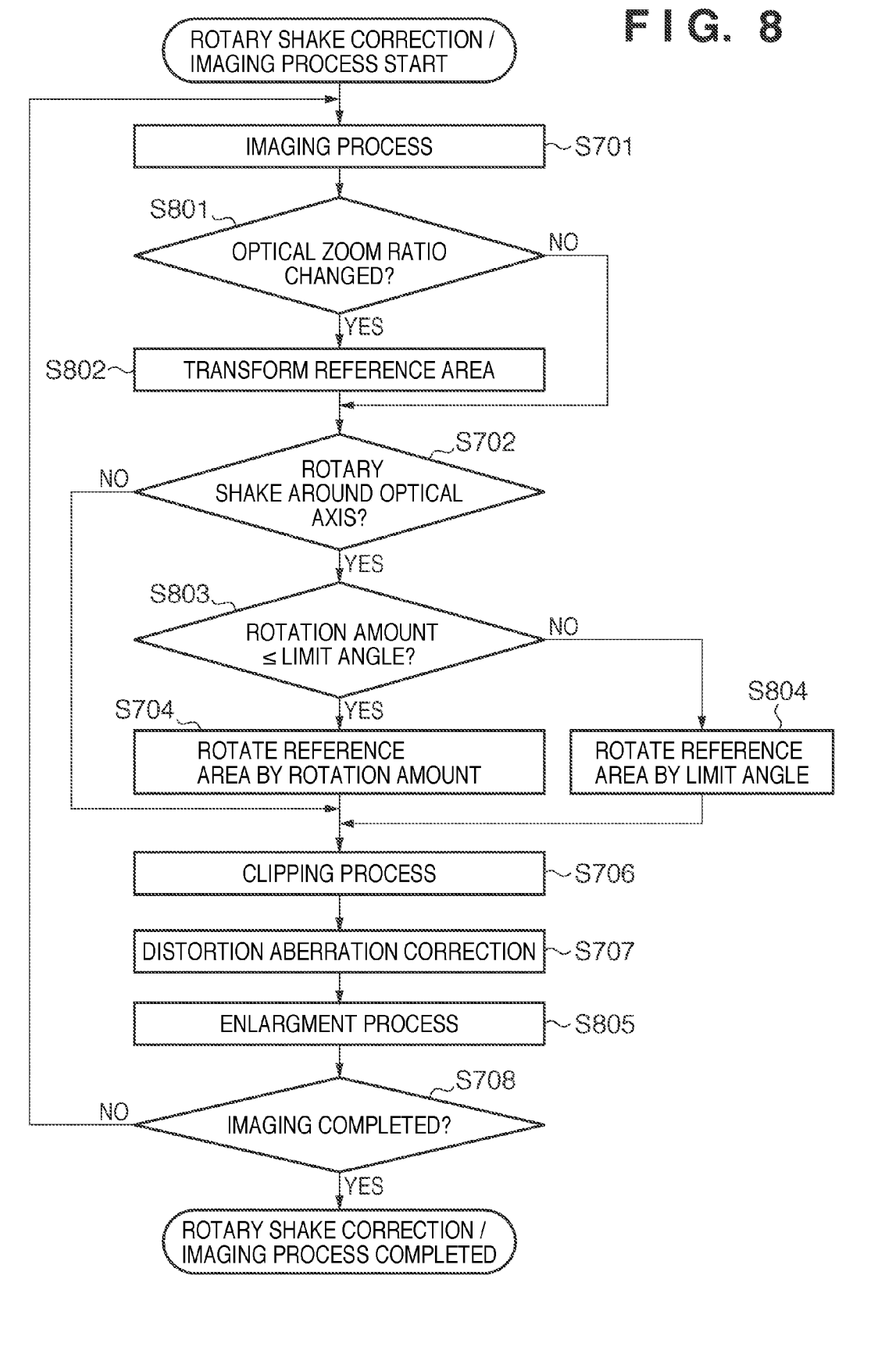
FIG. 8 is a flowchart showing a rotary shake correction/imaging process according to Embodiment 2.

The rotary shake correction/imaging process of the digital video camera of the present embodiment having such a configuration will be described further using the flowchart of FIG. 8. Note that this rotary shake correction/imaging process is started by the control unit 117 when the imaging start button provided in the operation unit 115 is pressed by the user, in a state where the camera shake correction function of the digital video camera 100 is enabled. Also, in the rotary shake correction/imaging process of the present embodiment, steps for performing the same processing as the rotary shake correction/imaging process of the aforementioned Embodiment 1 will be given identical reference numerals and description thereof will be omitted.

Imaging is performed in S701, and after the image processing unit 111 has applied correction processing other than rotary correction to the obtained image data, the control unit 117 judges whether the optical zoom ratio at the time of imaging has been altered by an input to the operation unit 115 from the user (S801). Specifically, the control unit 117 judges whether the optical zoom ratio has been altered from the zoom ratio before the start of the rotary shake correction/imaging process or at the time that imaging was last performed. If it is judged that the optical zoom ratio has been altered, the control unit 117 moves the processing to S802. If it is judged that the optical zoom ratio has not been altered, the control unit 117 moves the processing to S702.

In S802, the control unit 117 transforms the area to be referenced in distortion aberration correction according to the optical zoom ratio. Specifically, the control unit 117 transmits information on the area to be referenced in distortion aberration correction to the image processing unit 111, with reference to information on distortion aberration that depends on the zoom ratio, based on the parameters of the imaging optical system 120 stored in the storage unit 116, and causes the image processing unit 111 to transform the reference area. The control unit 117 performs the following processing in the case where the current zoom ratio is greater than the zoom ratio stored in the storage unit 116 at which rotary shake of an amount equal to the limit angle can be corrected without transforming the area to be referenced in distortion aberration correction. The control unit 117 transmits information on a transformed area to be referenced in distortion aberration correction stored in association with the current zoom ratio from the storage unit 116 to the image processing unit 111, and causes the image processing unit 111 to transform the reference area.

If, in S702, rotary shake was detected at the time of imaging, the control unit 117 moves the processing to S803. In S803, the control unit 117 moves the processing to S704 if the absolute value of the detected rotation amount is less than or equal to the limit angle for correcting rotary shake stored in the storage unit 116. If the absolute value of the detected rotation amount is greater than the limit angle, the control unit 117 moves the processing to S804.

In S804, the control unit 117 causes the image processing unit 111 to rotate the area to be referenced in distortion aberration correction within the area of the captured image by the limit angle. If, at this time, the optical zoom ratio is greater than the zoom ratio stored in the storage unit 116 at which rotary shake of the limit angle can be corrected without transforming the area to be referenced in distortion aberration correction, the area to be referenced in distortion aberration correction that has been rotated by an amount equal to the limit angle will be inscribed on the captured image.

After distortion aberration correction has been applied to the image included within the area to be referenced in distortion aberration correction in S707, the control unit 117 moves the processing to S805. In S805, the control unit 117 causes the image processing unit 111 to apply electronic zoom, such that the image obtained after applying distortion aberration correction will be the same size as the captured image.

Note that in the present embodiment a method of acquiring distortion aberration-corrected image and video data in which the influence of rotary shake has been reduced by prioritizing correction of distortion aberration and providing a limit angle for correction of rotary shake was described. However, correction of rotary shake may be prioritized by reducing the area to be referenced in distortion aberration correction to be nearer the center of the angle of view and dynamically lowering the correction amount of distortion aberration. In this case, with moving images, for example, the distortion of images between frames varies in the case of imaging under conditions where the correction amount of distortion aberration varies dynamically with the transition of time, and since this may be noticeable to the user when viewing the moving images, the correction amount of distortion aberration is kept constant.

Also, the present embodiment was described in terms of electronic zoom being applied in the case where a limit angle for performing rotary shake correction is set, and the optical zoom ratio is greater than the zoom ratio at which rotary shake of the limit angle can be corrected without transforming the area to be referenced in distortion aberration correction. However, since degradation in image quality occurs due to application of electronic zoom, the limit angle for correcting rotary shake may be dynamically altered depending on the optical zoom ratio. Specifically, as in Embodiment 1, the limit angle can be set to the maximum angle at which a reference area that enables an image of the same size as the captured image to be acquired when distortion aberration correction is performed can be rotated at respective optical zoom ratios. In this case, rotary shake correction is not performed for optical zoom ratios at which pincushion distortion aberration occurs.

As described above, the imaging apparatus of the present embodiment has an imaging optical system having distortion aberration, and is capable of obtaining a rectangular image corrected for rotary shake, when rotary shake whose rotation axis is the optical axis of an imaging optical system is detected at the time of imaging. Specifically, when correcting rotary shake, an area to be referenced in distortion aberration correction is rotated by the detected rotation amount in a direction correcting the rotary shake, so that the reference area fits within the area of the captured image. A rectangular image is then obtained by applying distortion aberration correction to the captured image included within the reference area. Also, with an optical zoom ratio at which the reference area will not fit in the area of the captured image when a limit angle for correcting rotary shake has been set and the reference area is rotated by the limit angle, the reference area is transformed so as to fit in the area of the captured image. Specifically, the reference area is transformed so as to form an image having the same aspect ratio as the captured image when distortion aberration correction has been performed, and to be inscribed on the captured image when rotated by the limit angle. The transformed reference area is then rotated within the area of the captured image by the detected amount of rotary shake or by the limit angle if the detected amount of rotary shake is greater than the limit angle, and distortion aberration correction is applied to the captured image included within the reference area. Further, the distortion aberration-corrected image is enlarged so as to be the same size as the captured image.

The image apparatus of the present embodiment is thereby capable of correcting rotary shake using information on non-referenceable areas that would be eliminated in the distortion aberration correction in the case where processing to correct rotary shake whose rotation axis is the optical axis is performed after the distortion aberration correction. Also, the image apparatus of the present embodiment applies distortion aberration correction after rotary shake in an area to be referenced in distortion aberration correction has been corrected based on the area of the captured image. Thus, in the case where a limit angle limiting correction of rotary shake has been set, the rate at which electronic zoom is applied in distortion aberration correction and rotary shake correction at the limit angle can be reduced, compared with the case where rotary shake whose rotation axis is the optical axis is corrected based on a distortion aberration-corrected image that is smaller than the captured image. Since the size of the area to be referenced in distortion aberration correction at respective optical zoom ratios is determined such that the reference area fits into the captured image at the limit angle for correcting rotary shake, the angle of view can be kept constant even when rotation has been corrected, when imaging moving images and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-289652, filed Dec. 21, 2009, which is hereby incorporated by reference herein in its entirety.

What is claimed is:

1. An imaging apparatus comprising:
an imaging unit configured to output an image captured via an imaging optical system;
a detection unit configured to detect rotary shake of the imaging apparatus, where the rotation axis of the rotary shake is an optical axis of the imaging optical system; and
an image processing unit configured to perform image processing;
wherein the image processing unit comprises:
a rotary correction unit configured to set a reference area, which has a shape determined considering distortion aberration caused by the imaging optical system, within the captured image where the reference area is rotated with respect to the rotation axis, and correct the influence of the rotary shake detected by the detection unit by rotating an image included in the reference area; and
a distortion aberration correction unit configured to correct distortion aberration in the image included in the reference area
wherein, the rotary correction unit rotates the image included in the reference area such that the reference area is included within the captured image.

2. The imaging apparatus according to claim 1, wherein the imaging optical system further comprises a zoom unit whose optical zoom ratio is changeable, and the rotary correction unit transforms the reference area, depending on the optical zoom ratio.

3. The imaging apparatus according to claim 2, wherein if the rotary correction unit has a limit angle for correcting the rotary shake, the reference area transformed depending on the optical zoom ratio is an area which fits into the area of the captured image when the reference area is rotated by the limit angle.

4. The imaging apparatus according to claim 1, wherein the distortion aberration correction unit performs an enlargement process on a rectangular image obtained after correcting the distortion aberration.

5. The imaging apparatus according to claim 4, wherein the distortion aberration correction unit enlarges the rectangular image to a same size as the captured image.

6. The imaging apparatus according to claim 1, wherein correction by the rotary correction unit and correction by the distortion aberration correction unit are performed simultaneously.

7. The imaging apparatus according to claim 1, wherein correction by the rotary correction unit and correction by the distortion aberration correction unit are performed in an image processing process.

8. The imaging apparatus according to claim 1, wherein the shape of the reference area is a barrel-shape or a pincushion-shape.

9. A control method of an imaging apparatus comprising the steps of:
outputting an image captured via an imaging optical system;
detecting rotary shake of the imaging apparatus, where the rotation axis of the rotary shake is an optical axis of the imaging optical system; and
setting a reference area, which has a shape determined considering distortion aberration caused by the imaging optical system, within the captured image where the reference area is rotated with respect to the rotation axis, and correcting the influence of the rotary shake detected in the detection step by rotating an image included in the reference area; and
correcting distortion aberration in the image included in the reference area,
wherein the image included in the reference area is rotated such that the reference area is included within the captured image.

10. An imaging apparatus comprising:
an imaging unit configured to output an image captured via an imaging optical system;
a detection unit configured to detect rotary shake of the imaging apparatus, where the rotation axis of the rotary shake is an optical axis of the imaging optical system; and
an image processing unit configured to perform image processing;
wherein the image processing unit comprises:
a rotary correction unit configured to set a reference area, which has a shape determined considering distortion aberration caused by the imaging optical system and which is a subset of the captured image, within the captured image where the reference area is rotated with respect to the rotation axis, and correct the influence of the rotary shake detected by the detection unit by rotating an image included in the reference area; and
a distortion aberration correction unit configured to correct distortion aberration in the image included in the reference area.

11. An imaging apparatus comprising:
an imaging unit configured to output an image captured via an imaging optical system;

a detection unit configured to detect rotary shake of the imaging apparatus, where the rotation axis of the rotary shake is an optical axis of the imaging optical system; and an image processing unit configured to perform image processing;

wherein the image processing unit comprises:

a rotary correction unit configured to set a reference area, which has a shape determined considering distortion aberration caused by the imaging optical system and which is a subset of the captured image, within the captured image where the reference area is rotated with respect to the rotation axis, and correct the influence of the rotary shake detected by the detection unit by rotating an image included in the reference area; and a distortion aberration correction unit configured to correct distortion aberration in the image included in the reference area wherein, the rotary correction unit rotates the image included in the reference area such that the reference area is included within the captured image.

12. A control method of an imaging apparatus comprising the steps of:

outputting an image captured via an imaging optical system;

detecting rotary shake of the imaging apparatus, where the rotation axis of the rotary shake is an optical axis of the imaging optical system; and performing image processing;

wherein the performing image processing comprises:

setting a reference area, which has a shape determined considering distortion aberration caused by the imaging optical system and which is a subset of the captured image, within the captured image where the reference area is rotated with respect to the rotation axis, and correcting the influence of the rotary shake detected in the detecting step by rotating an image included in the reference area; and correcting distortion aberration in the image included in the reference area.

13. A control method of an imaging apparatus comprising the steps of:

outputting an image captured via an imaging optical system;

detecting rotary shake of the imaging apparatus, where the rotation axis of the rotary shake is an optical axis of the imaging optical system; and performing image processing;

wherein the performing image processing comprises:

setting a reference area, which has a shape determined considering distortion aberration caused by the imaging optical system and which is a subset of the captured image, within the captured image where the reference area is rotated with respect to the rotation axis, and correcting the influence of the rotary shake detected in the detecting step by rotating an image included in the reference area; and correcting distortion aberration in the image included in the reference area wherein, the rotary correction unit rotates the image included in the reference area such that the reference area is included within the captured image.

* * * * *